United States Patent [19]

Ogawa et al.

[11] Patent Number: 5,421,427
[45] Date of Patent: Jun. 6, 1995

[54] BATTERY PLACEMENT FOR AN ELECTRIC VEHICLE

[75] Inventors: Masao Ogawa; Hiroyuki Sako; Sadashi Yamamoto, all of Saitama, Japan

[73] Assignee: Honda Giken Kogyo Kabushiki Kaisha, Tokyo, Japan

[21] Appl. No.: 186,617

[22] Filed: Jan. 26, 1994

[30] Foreign Application Priority Data

Jan. 26, 1993 [JP] Japan .................. 5-029919
Sep. 17, 1993 [JP] Japan .................. 5-231168

[51] Int. Cl.⁶ ................... B62D 61/02; B62K 19/46
[52] U.S. Cl. ..................... 180/220; 180/65.1
[58] Field of Search ............ 180/220, 229, 219, 65.1, 180/65.8

[56] References Cited

U.S. PATENT DOCUMENTS

| | | | |
|---|---|---|---|
| 2,104,773 | 1/1938 | Saunders | 180/68.5 |
| 2,717,045 | 9/1955 | Nallinger | 180/68.5 X |
| 3,003,573 | 10/1961 | Lorenz | 180/68.5 |
| 3,163,251 | 12/1964 | Rees | 180/300 |
| 3,713,502 | 1/1973 | Delaney et al. | 180/217 X |
| 3,745,048 | 7/1973 | Dinkler et al. | 429/120 |
| 3,928,080 | 12/1975 | Aronson | 429/81 |
| 4,111,274 | 9/1978 | King et al. | 180/216 X |
| 4,135,593 | 1/1979 | Fowkes | 180/68.5 X |
| 4,183,418 | 1/1980 | Dudas | 180/216 |
| 4,406,342 | 9/1983 | Lacroix | 180/68.5 |
| 4,897,322 | 1/1990 | Jessen | 429/62 |
| 5,015,545 | 5/1991 | Brooks | 180/68.5 |
| 5,101,124 | 4/1992 | Yamagiwa et al. | 180/220 |
| 5,207,288 | 5/1993 | Ono | 180/65.5 X |
| 5,222,572 | 6/1993 | Yamagiwa et al. | 180/220 |

FOREIGN PATENT DOCUMENTS

| | | |
|---|---|---|
| 327023 | 12/1976 | Austria . |
| 0003888 | 2/1979 | European Pat. Off. . |
| 0050057 | 9/1981 | European Pat. Off. . |
| 0539269 | 4/1993 | European Pat. Off. . |
| 639011 | 6/1928 | France . |
| 2168886 | 9/1973 | France . |
| 2180709 | 11/1973 | France . |
| 2486311 | 1/1981 | France . |
| 2669585 | 5/1992 | France . |
| 515051 | 12/1930 | Germany . |
| 801371 | 7/1949 | Germany . |
| 3110365 | 10/1982 | Germany . |
| 4018347 | 12/1991 | Germany . |
| 2182590 | 7/1990 | Japan .................. 180/220 |
| 3-105098 | 4/1991 | Japan . |
| 3-128789 | 5/1991 | Japan . |
| 3-243484 | 10/1991 | Japan . |
| 5105143 | 4/1993 | Japan .................. 180/220 |
| 5105147 | 4/1993 | Japan .................. 180/220 |
| 1298046 | 4/1971 | United Kingdom . |
| 2027978 | 8/1979 | United Kingdom . |
| WO84/00642 | 2/1984 | WIPO . |

OTHER PUBLICATIONS

Patent Abstracts of Japan, vol. 16, No. 34 (M-1204)(5077) Jan. 28, 1992 & JP-A-03 243 484 (Honda) Oct. 30, 1991, abstract.

Primary Examiner—Margaret A. Focarino
Assistant Examiner—Kevin Hurley

[57] ABSTRACT

A container and a charging unit are positioned on an electric vehicle in which only a limited space is available. The container is used for holding a helmet and other items and is disposed under a seat. A charging unit is disposed behind the container and above a rear wheel. Since a comparatively large space can be secured behind the container disposed under the seat, and above the rear wheel, the charging unit may be comparatively large.

13 Claims, 11 Drawing Sheets

BATTERY PLACEMENT FOR AN ELECTRIC VEHICLE

BACKGROUND OF THE INVENTION

1. Field of the Invention

The present invention relates to an electric vehicle, and more particularly, to the disposition of a charging unit on an electric vehicle.

2. Description of Background Art

A known saddle type electric vehicle is disclosed, for example, in Japanese Patent Laid-open No. 3-243484. This known electric vehicle is featured by the placement of battery units between the front and rear wheels and below a line connecting the front and rear axles. Electric energy is supplied to the battery units through a charging connector.

OBJECTS OF THE INVENTION

The known, conventional electric vehicle receives electric energy having a voltage range of 6 to 24 V direct current through a separate battery charger.

However, since battery chargers are not normally available during use of a vehicle on an open highway, the driver must pay attention to the remaining amount of electric energy of the battery units and must arrive at a charging station before the electric energy of the battery units is exhausted. Therefore, it is desirable to equip an electric vehicle with a battery charger to enable supplying electric energy to the battery units from a commercial power source of 100 V alternating current.

It is difficult to construct vehicle to be light weight when a limited space is available, such as a motorcycle, with a charger and, moreover, such a light vehicle must have a large container for containing a helmet and other items.

Accordingly, it is an object of the present invention to provide a technique for ingeniously arranging a large container and a charging unit on an electric vehicle in which only a limited space is available.

SUMMARY OF THE INVENTION

The present invention provides a large container for containing a helmet and other items which is disposed under the seat, and a charging unit disposed behind the container and above the rear wheel.

A charging cord extends over the charging unit and behind the container.

The charging unit is provided with a charger cooling fan, and the charger cooling fan is positioned laterally off the center plane of the body.

The charging unit is placed in a comparatively large space behind the container disposed under the seat and above the rear wheel.

When charging the battery units, the charging cord is used. Although the charger of the charging unit generates heat, the charger can be cooled by the charger cooling fan. The charger cooling fan is prevented from being splashed with debris splashed by the wheels by positioning the charger cooling fan laterally off the center plane passing the center planes of the wheels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
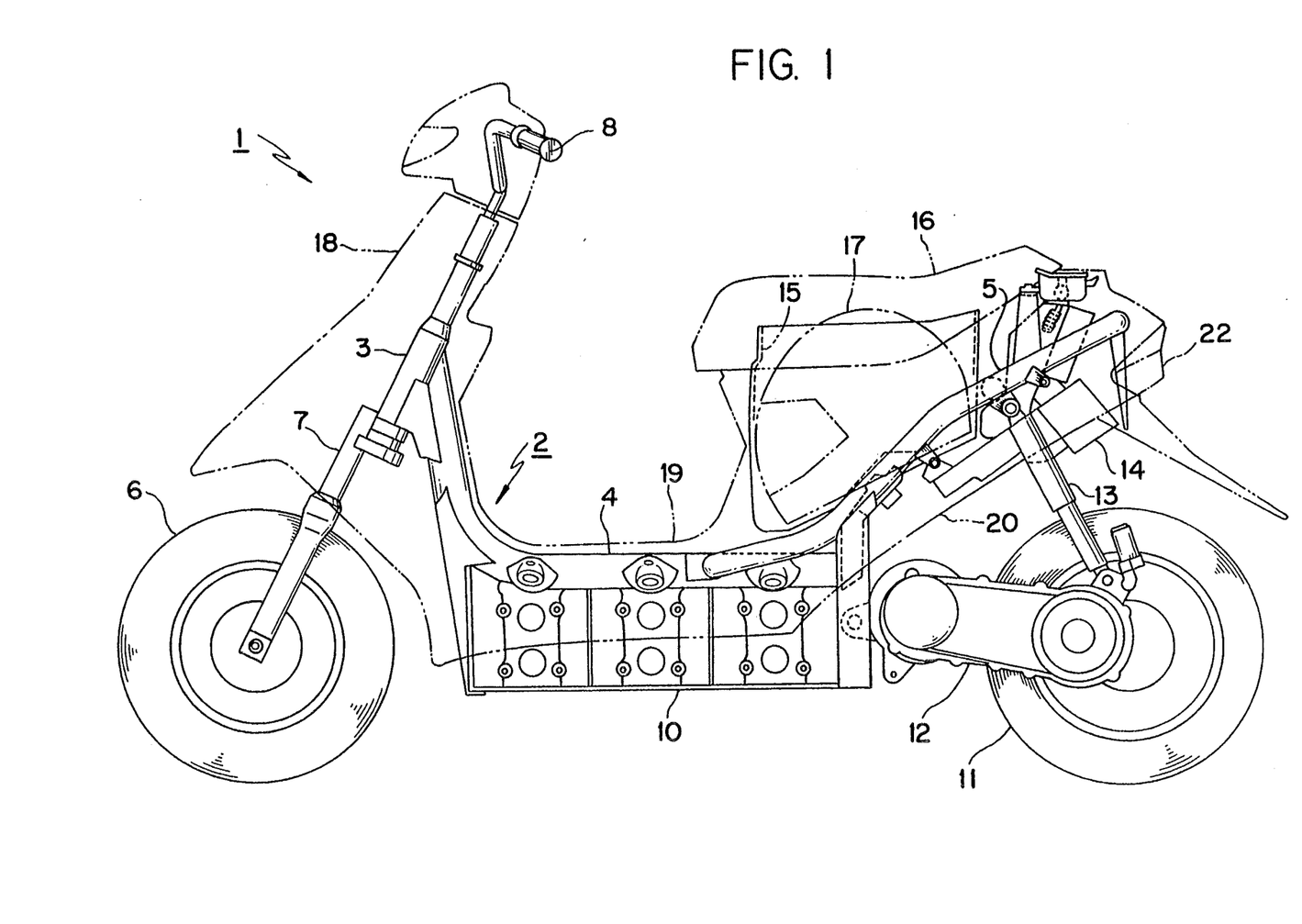
FIG. 1 is a side view of an electric vehicle in accordance with the present invention.

A preferred embodiments of the present invention will be described hereinafter with reference to the accompanying drawings. FIG. 1 is a side view of an electric vehicle in a preferred embodiment according to the present invention. The electric vehicle 1, such as an electric motorcycle, has a frame 2 including a head pipe 3, a center frame 4 and a rear frame 5. The stem of a front fork 7 is supported in the head pipe 3, a handle bar 8 is joined to the upper end of the stem of the front fork 7, and a front wheel 6 is supported on the fork end of the front fork 7. A battery housing 10 is attached to the center frame 4. A rear wheel 11, a swing power unit 12, a rear suspension 13, a charging unit 14, a large container 15 and a seat 16 are arranged upward in that order in the rear portion of the frame 2. The large container is able to contain a helmet 17.

A front cover 18, a middle cover 19, and a rear cover 20 are secured to the motorcycle. In FIG. 1, boundaries between the front cover 18 and the middle cover 19 and between the middle cover 19 and the rear cover 20 are not illustrated in the drawings. A tail lamp 22 is provided at the rear of the motorcycle.

Figure 2:
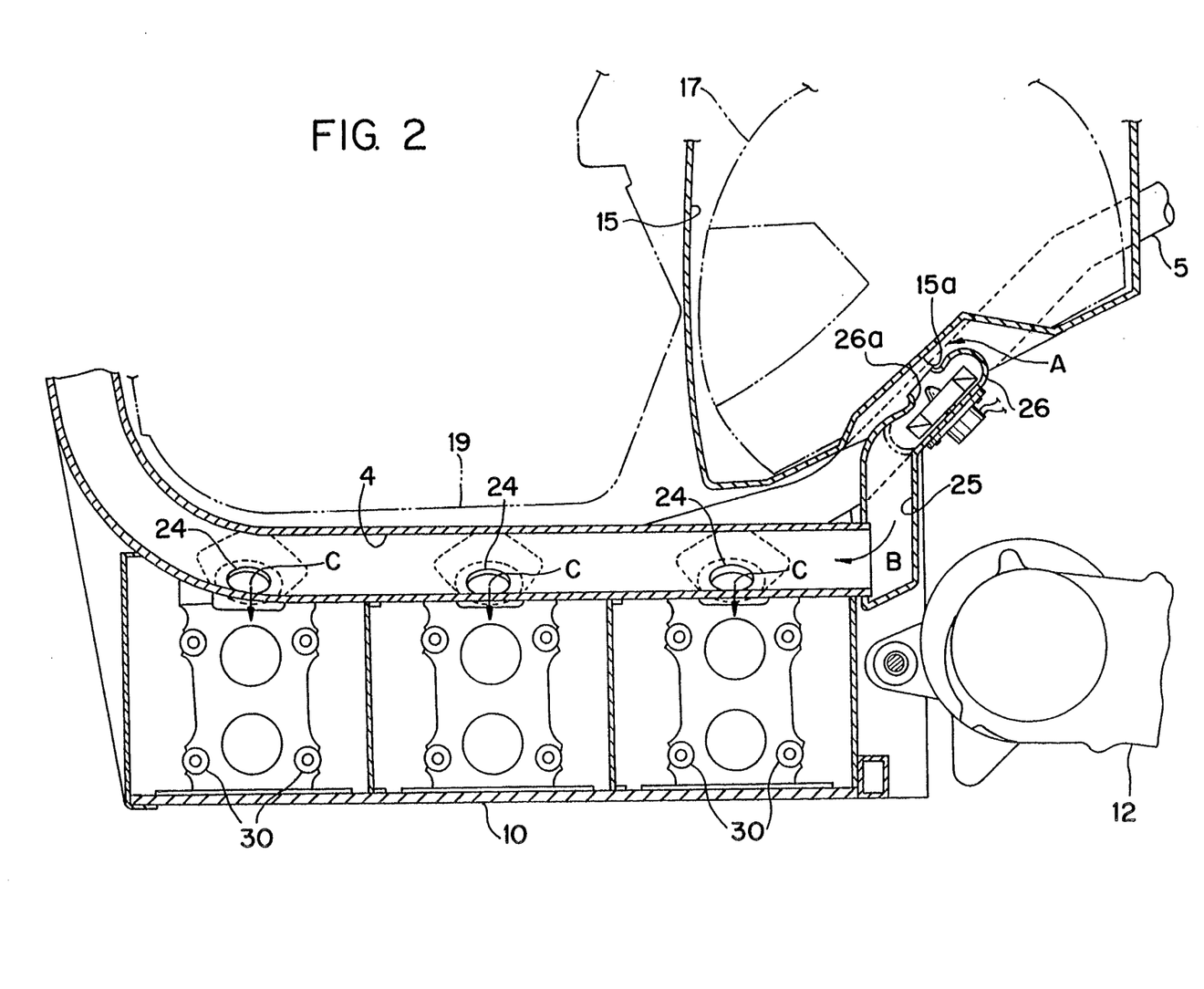
FIG. 2 is an enlarged view of a center frame included in the electric vehicle in accordance with the present invention.

FIG. 2 is an enlarged view of the center frame of the electric vehicle in accordance with the present invention. The center frame 4 is a hollow structure. The center frame 4 is provided with six air outlet openings 24, three air outlet openings 24 in each of the opposite side walls thereof. A battery cooling fan 26 is connected to the rear end of the center frame 4 by a duct 25.

The battery cooling fan 26 is placed in a cavity 15a formed by raising a portion of the bottom wall of the large container 15. The battery cooling fan 26 is a centrifugal fan. The inlet opening 26a of the battery cooling fan 26 opens substantially upward.

Figure 3:
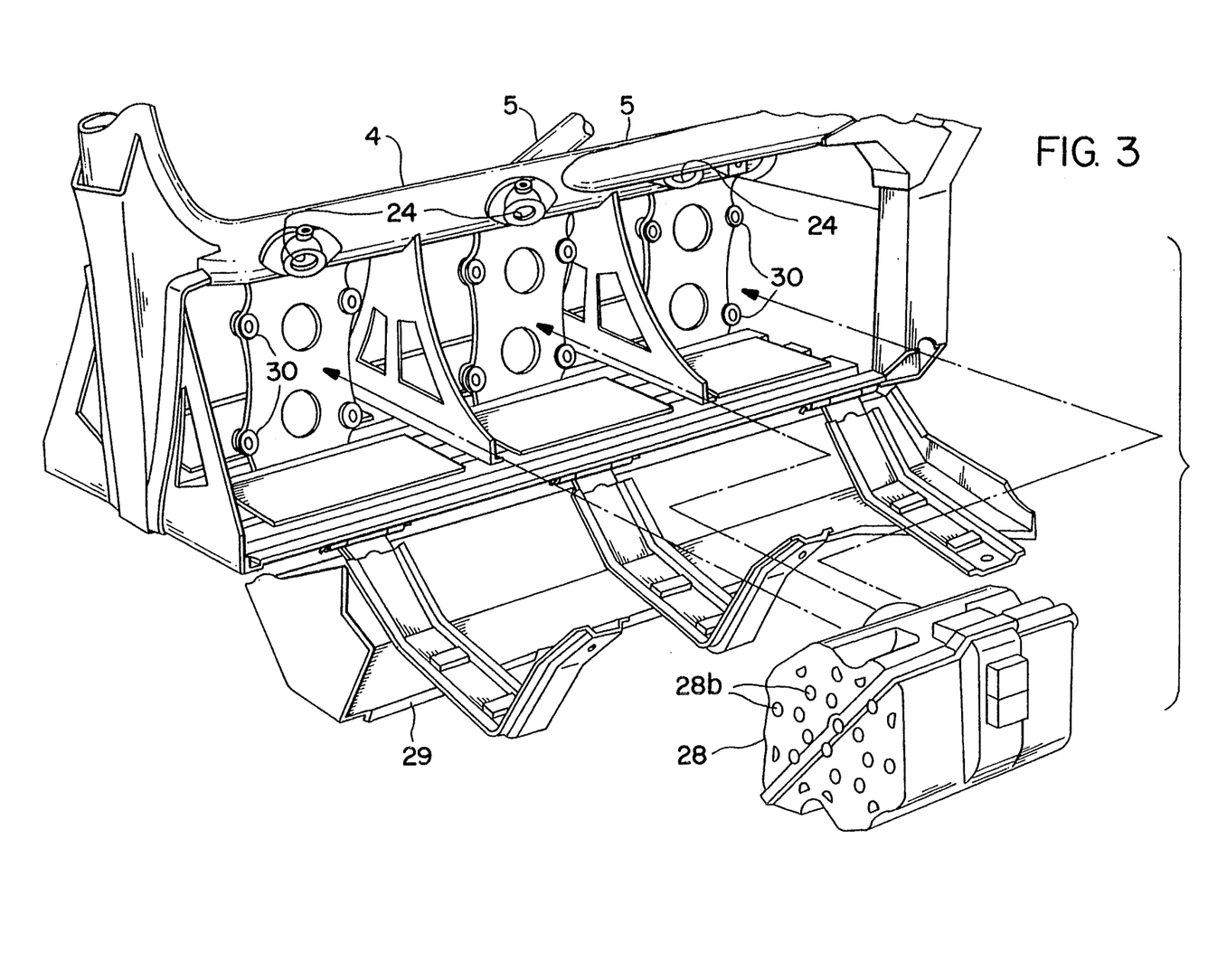
FIG. 3 is a perspective view of a battery housing included in the electric vehicle in accordance with the present invention.

FIG. 3 is a perspective view of the battery housing of the electric vehicle in accordance with the present invention. The electric vehicle 1 carries six battery units 28; three battery units 28 on one side of the center frame 4 and three battery units 28 on the other side of the center frame 4. The battery units 28 are put in the battery housing in the direction of the arrows and the lids 29 are closed. The battery units 28 are seated, respectively, on elastic rubber pads 30.

Figure 4:
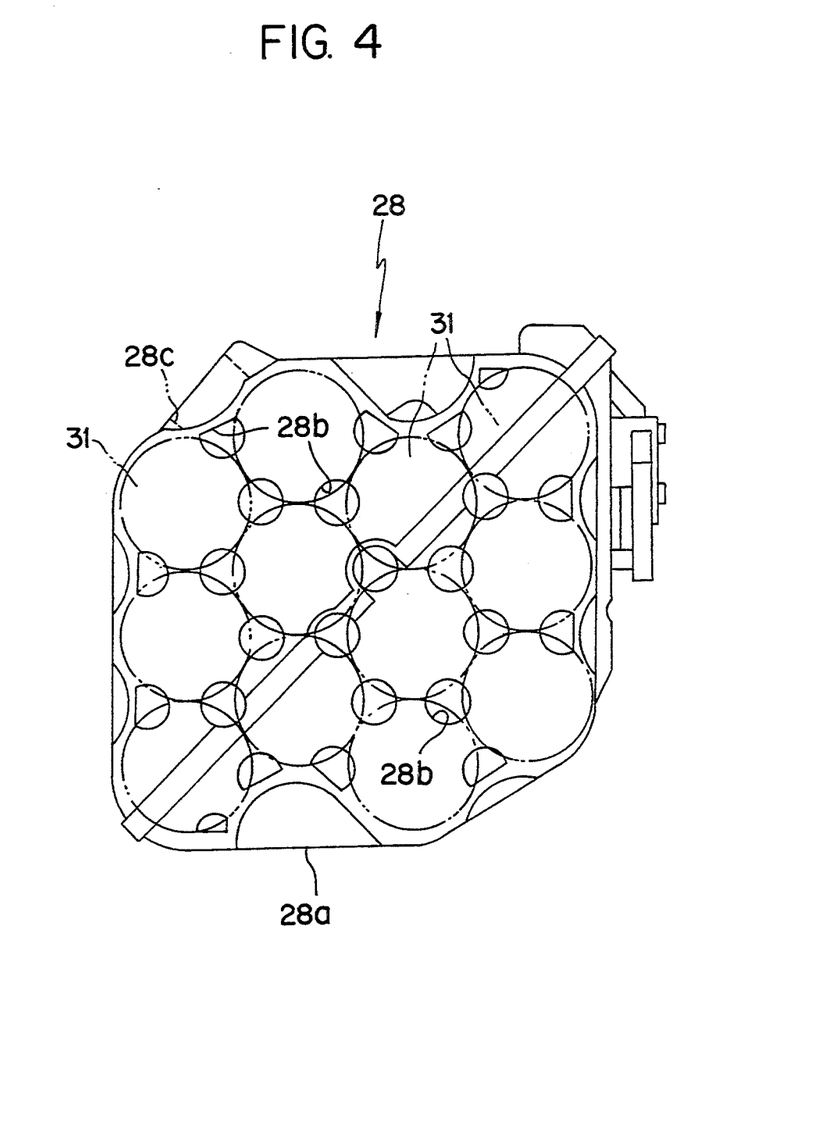
FIG. 4 is a front view of a battery unit suitable for the electric vehicle in accordance with the present invention.

FIG. 4 is a front view of the battery unit 28 suitable for the electric vehicle in accordance with the present invention. The battery unit 28 has a split case 28a provided with a plurality of openings 28b in its front and rear walls. A plurality of cells 31 indicated by imaginary lines are contained in the split case 28a. When the battery unit 28 is set in the battery housing 10, an air inlet opening 28c formed in the upper shoulder of the split case 28a of the battery unit 28 coincides with the air outlet opening 24 shown in FIG. 3.

Figure 5:
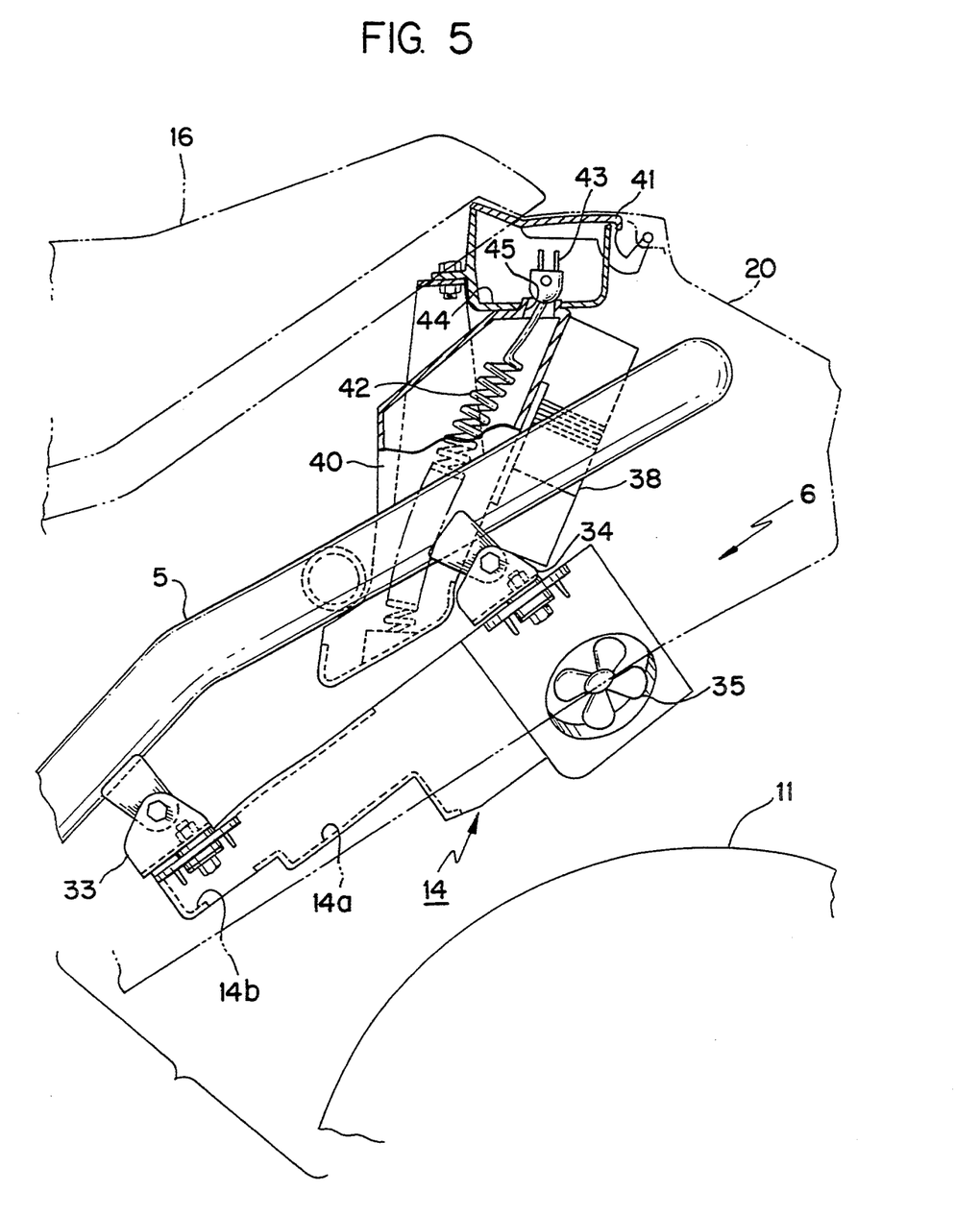
FIG. 5 is a partly sectional side view illustrating the disposition of a charging unit and a cord receptacle included in the electric vehicle in accordance with the present invention.

FIG. 5 shows a charging unit and a charging cord receptacle included in the electric vehicle in accordance with the present invention. The large container 15 for containing a helmet and other items is disposed under the seat 16, and the charging unit 14 is disposed behind the container 15 (FIG. 1) and above the rear wheel 11. The large container 15 is positioned beneath the longitudinal center of the seat 16.

The charging unit 14 has the shape of a considerably large box and is disposed under and along the rear frame 5 extending obliquely upwardly towards the rear. The charging unit 14 is fastened to the rear frame 5 by fastening members 33 and 34. Since the rear frame 5 extends obliquely upwardly and has an extended length, the charging unit 14 may be formed in a large size. Since the charging unit 14 is disposed under the rear frame 5, no possibility exists for the rear wheel 11 that moves up and down relative to the rear frame 5 to collide against the charging unit 14.

Figure 6:
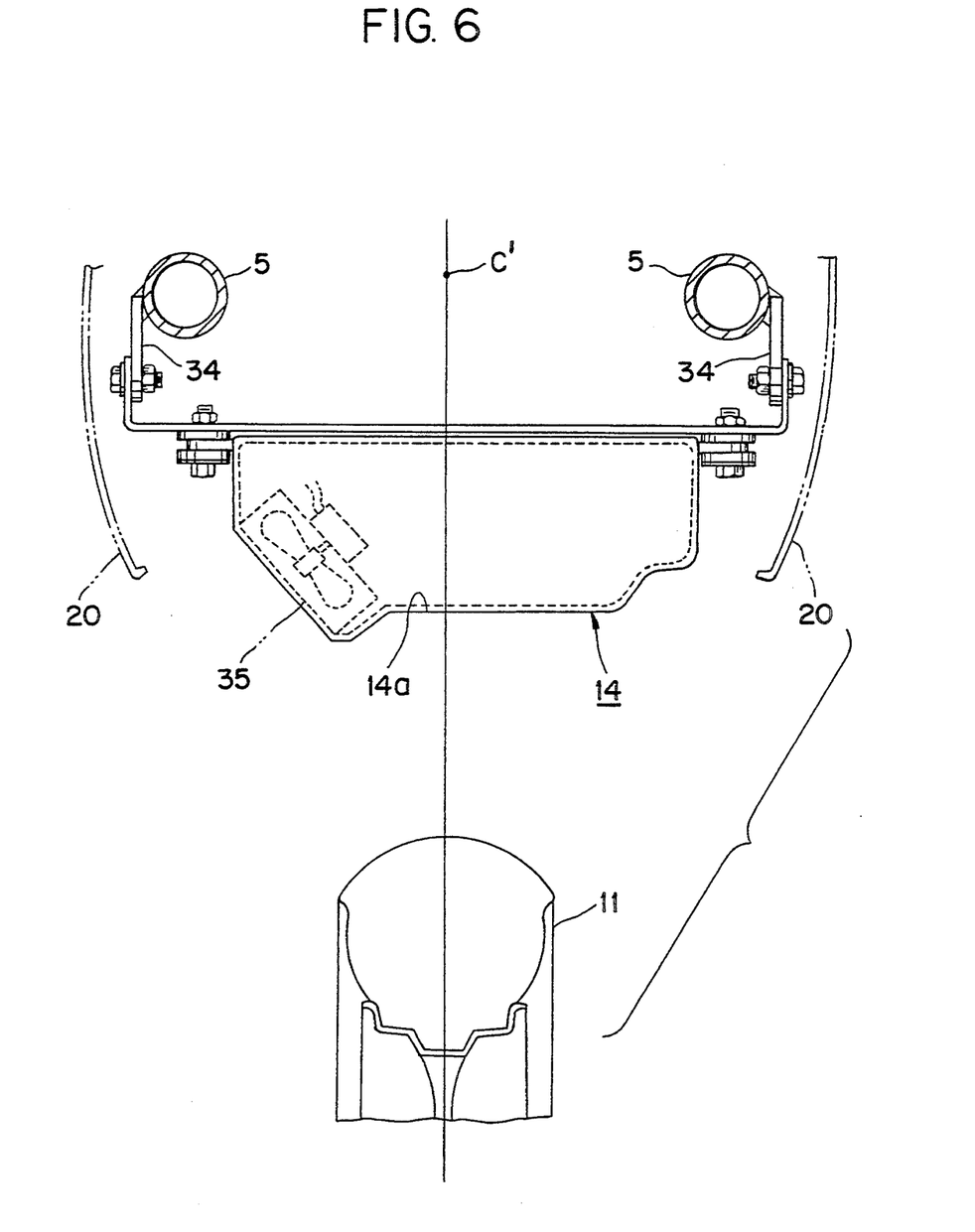
FIG. 6 is a view taken along the arrow 6 in FIG. 5.

FIG. 6 is a view taken along the direction of the arrow 6 in FIG. 5. The charging unit 14 is provided with a charger cooling fan 35 in the lower left-hand corner thereof, as viewed in FIG. 6. The charger cooling fan 35 is disposed laterally off the center plane C of the frame. The charger cooling fan 35 is an axial fan capable of forcibly discharging air from the interior of a charger case 14a.

Referring again to FIG. 5, the charger case 14a of the charging unit 14 is provided with an air inlet opening 14b in the lower front end thereof. The charger cooling fan 35 sucks cool air through the air inlet opening 14b into the charger case 14a to cool the interior of the charger case 14a and discharges warm air outside the charger case 14a. The charger cooling fan 35 is protected with a net or a grid, not shown, so that nothing is able to contact the charger cooling fan 35 from outside.

A down regulator 38 and the charging cord receptacle 40 are arranged above the charging unit 14. The down regulator 38 converts, for example, 100 V alternating current into 24 V direct current.

The charging cord receptacle 40 has the shape of a conventional fuel tank and is provided with a lid 41 at its upper end. A curled charging cord 42 provided with a plug 43 at its free end is contained in the charging cord receptacle 40 with the plug 43 held in an opening 45 formed in a plate 44 disposed under the lid 41.

When charging the battery units, the seat 16 is raised, the lid 41 is removed, and the plug 43 is taken out from the charging cord receptacle 40, pulling out the charging cord 42. This procedure is the same as a fuel filling procedure.

Figure 7:
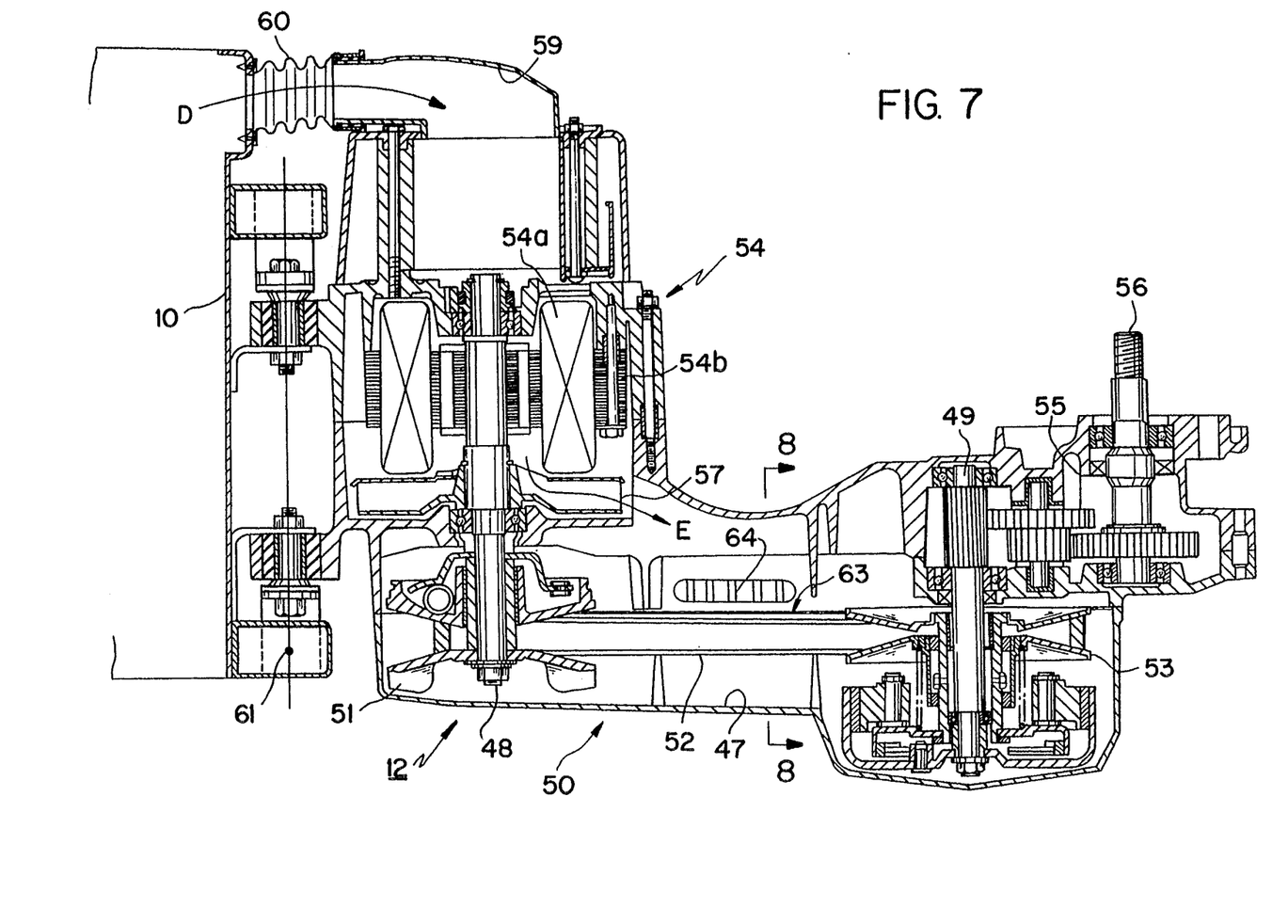
FIG. 7 is a sectional plan view of a swing power unit in accordance with the present invention.

FIG. 7 is a sectional plan view of the swing power unit 12. The swing power unit 12 has a transmission case 47 supporting a driving shaft 48 and a driven shaft 49 in parallel with each other. The driving shaft 48 and the driven shaft 49 are interlocked with each other by a V-belt type continuously variable ratio changing mechanism 50 comprising a driving pulley 51, a driven pulley 53 and a driving belt 52 interconnecting the driving pulley 51 and the driven pulley 53. The driving shaft 48 is incorporated into an electric motor 54 comprising a rotor 54a and a stator 54b. The driven shaft 49 is interlocked through an intermediate gear 55 with a rear axle 56.

A motor cooling fan 57 is mounted on the driving shaft 48 at a position on one side of the rotor 54a near the driving pulley 51. A duct 59 has one end connected to one end of the battery housing 10 and the other end connected to the transmission case 47 at a position opposite the electric motor 54.

The duct 59 is connected to the battery housing 10 by a flexible pipe 60 to absorb the swing motion of the power transmission case 47 on a pivot shaft 61 connecting the front end of the power transmission case 47 to the battery housing 10 relative to the fixed battery housing 10. It is a feature of the present invention that the flexible pipe 60 is located so that the flexible pipe 60 flexes about the axis of the pivot shaft 61.

Figures 8, 9:
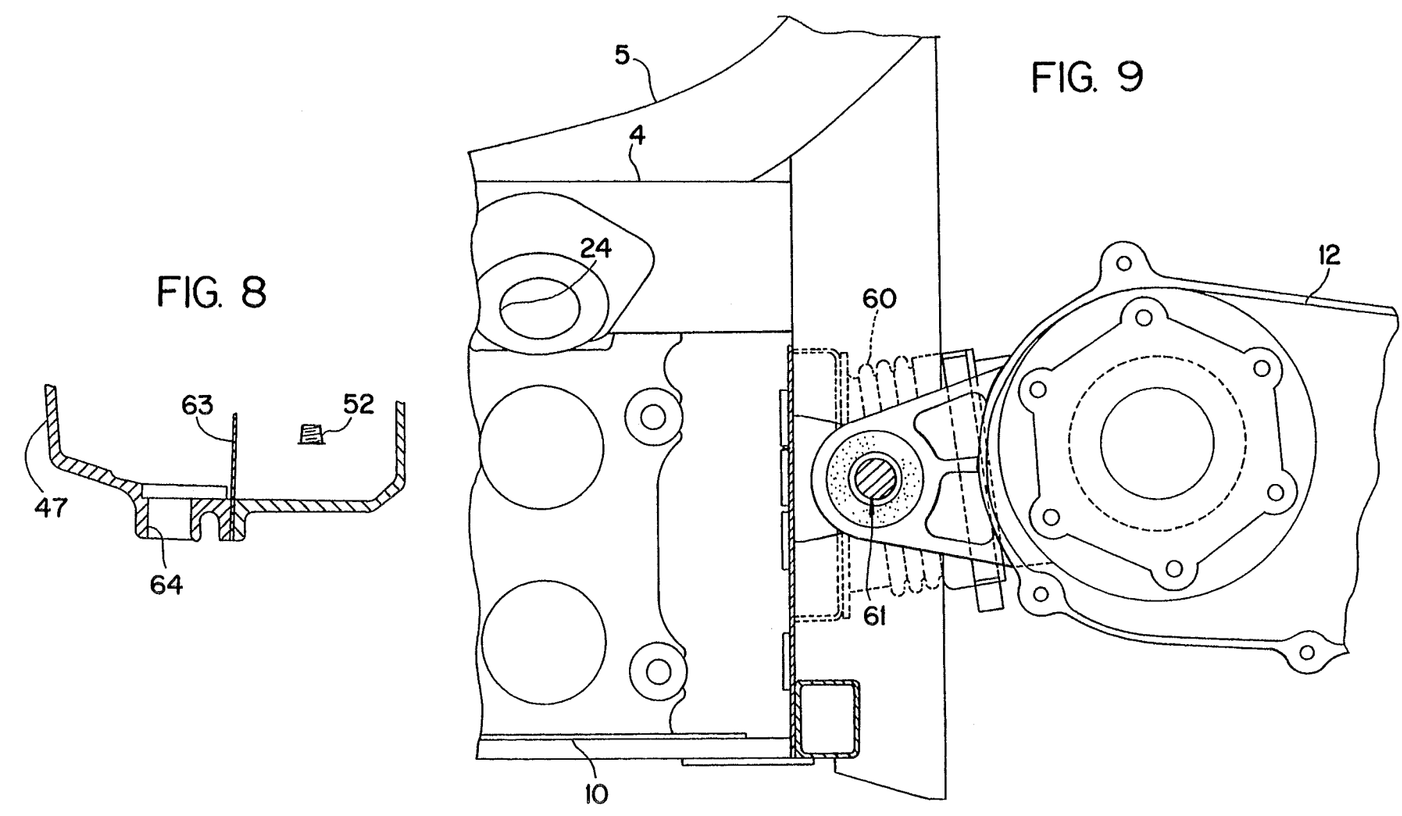
FIG. 8 is a fragmentary sectional view taken on line 8—8 in FIG. 7.
FIG. 9 is a view of assistance in explaining the connection of the swing power unit and a frame in accordance with the present invention.

FIG. 8 is a sectional view taken on line 8—8 in FIG. 7. The power transmission case 47 is formed by joining together a right half case and a left half case with a gasket inserted between the right and left half cases. A portion of the gasket is extended inward to form a separator 63 for separating a space in which the driving belt 52 extends from an air discharge opening 64, the function of which will be described later. A separate thin metal plate may be used instead of a portion of the gasket as the separator 63. The separator 63 may be of any shape and material provided that the separator 63 is capable of separating the space in which the driving belt 52 extends from the air discharge opening 64.

FIG. 9 is a fragmentary view showing the junction between the frame and the swing power unit. As is obvious from FIG. 9, the axis of the pivot shaft 61 intersects the axis of the flexible pipe 60.

The flexible pipe 60 employed in this embodiment is a bellows, which is capable of easily and elastically bending in opposite directions and has a long service life.

The operation of the electric vehicle thus constructed will be described hereinafter.

The battery units generate heat while the battery units are charged and while the electric vehicle is traveling. Therefore, the battery cooling fan 26 is operated while the battery units 26 are charged and while the electric vehicle is traveling to force cooling air into the battery housing 10 in the directions indicated by the arrows A, B, C. The cooling airflows through substantially triangular spaces between the cells 21, FIG. 4, and the cooling air which has cooled the cells 21 is discharged through the openings 28b.

The charger of the charging unit 14 generates heat while charging the cells of the battery units. Therefore, the charger cooling fan 35 is operated while the charging unit 14 is in operation to cool the charger of the charging unit 14 by cooling air sucked through the air inlet opening 14b into the charging unit 14.

The charger cooling fan 35 is disposed above the rear wheel 11 at a position laterally off the center line C' of the frame as shown in FIG. 6 and directed obliquely downward. There is no possibility that the charger cooling fan 35 is splashed with debris by the rear wheel 11.

As mentioned above, the seat 16 is raised, the lid 41 is removed and the plug 43 is taken out for charging, pulling out the charging cord 42. After the completion of the charging operation, the charging cord 42 is returned into the cord receptacle 40, the lid 41 is put on the cord receptacle 40 and the seat 16 is returned to its working position. Thus, the battery charging procedure is similar to the conventional fuel filling procedure.

The electric motor 54 generates heat during operation. The motor cooling fan 57, FIG. 7, sucks clean air from the battery housing 10 as indicated by the arrows D and E for the forced cooling of the electric motor 54 and discharges the air through the air discharge opening 64 formed in the bottom of the transmission case 47.

As shown in FIG. 9, the swing power unit 12 swings on the pivot shaft 61 according to the vertical movement of the rear wheel 11 relative to the frame.

When the swing power unit 12 swings, the flexible pipe 60 bends in a curve. However, since the flexible pipe 60 is disposed so that the axis of the pivot shaft 61 intersects the axis of the flexible pipe 60, the flexible pipe 60 does not bend greatly, so that the flexible pipe 60 will not wear out rapidly and has a long service life.

An electric vehicle in a second embodiment according to the present invention will be described hereinafter.

Figure 10:
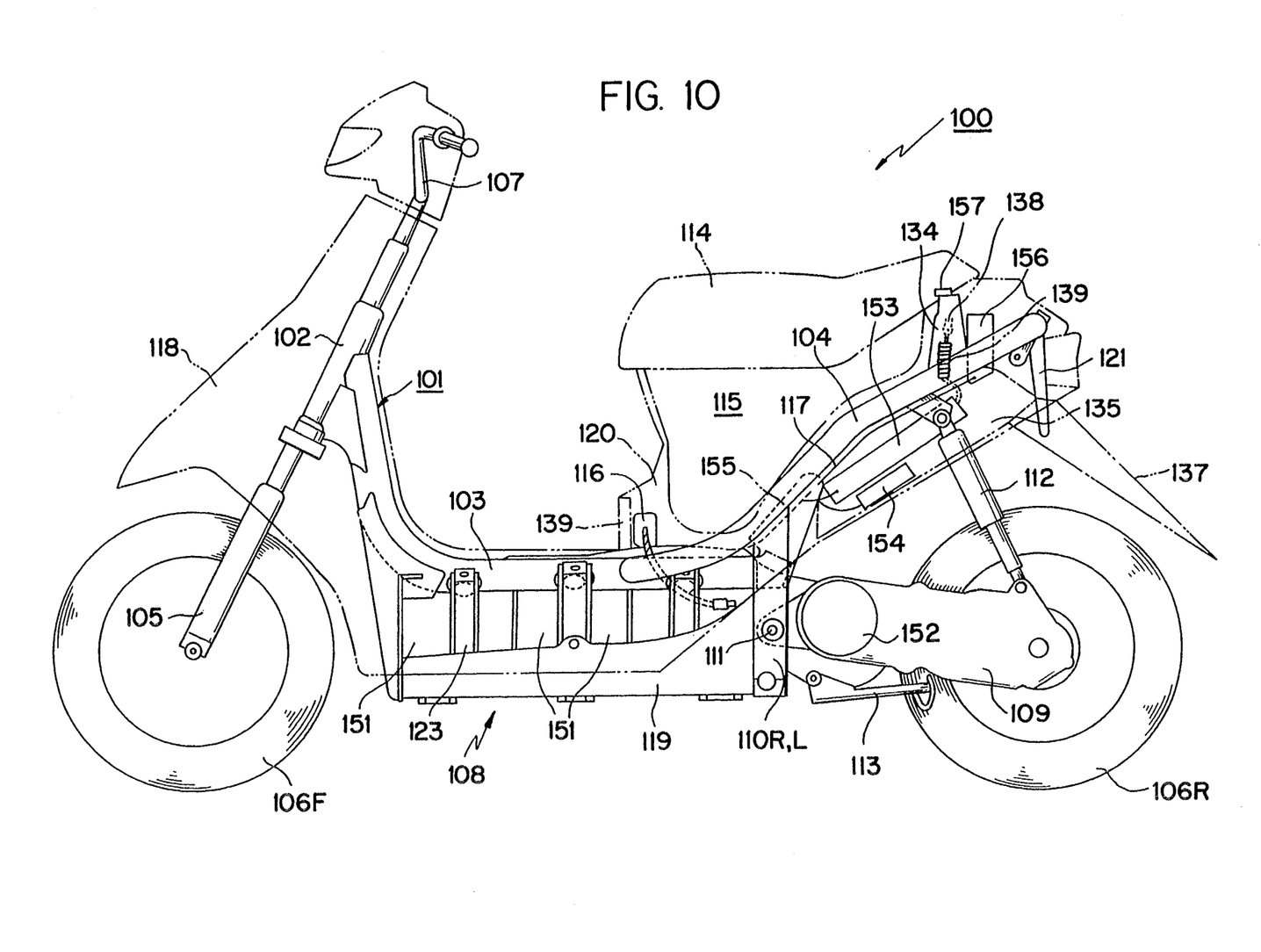
FIG. 10 is a side view of an electric vehicle in a second embodiment according to the present invention.
Figure 11:
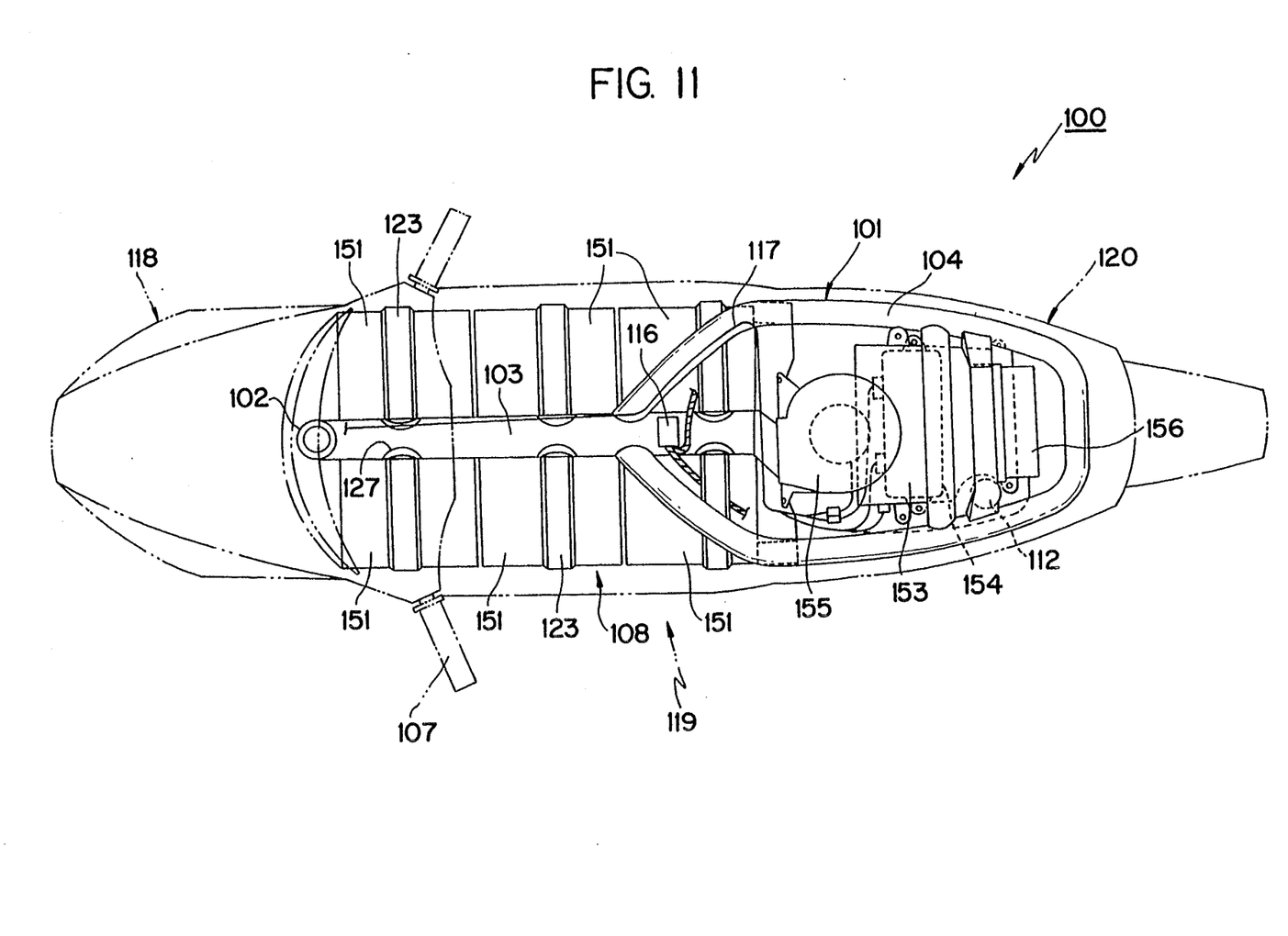
FIG. 11 is a plan view of the electric vehicle in the second embodiment.

FIG. 10 is a side view of the electric vehicle in the second embodiment and FIG. 11 is a plan view of the electric vehicle of FIG. 10.

The electric vehicle 100 has a frame 101 consisting of a head pipe 102, i.e., a front frame, a center frame 103 and a rear frame 104. A front fork 105 is supported on the head pipe 102, a front wheel 106F is supported on the lower end of the front fork 105, and a handle bar 107 is attached to the upper end of the front fork 105 to control the front wheel 106F. A battery housing 108 forms the lower portion of the center frame 103. Three battery units 151 are contained in each of the right and left chambers of the battery housing 108.

The front end of a swing power unit 109, provided with a built-in electric motor 152, is supported by a pivot shaft 111 on a pair of support pipes 110L and 110R projecting downward from the rear frame 104 so that the swing power unit 109 is able to swing on the pivot shaft 111. The rear end of the swing power unit 109 is connected to the rear frame 104 by a suspension 112. A rear wheel 106R is supported on the rear end of the swing power unit 109.

A side stay switch, not shown is disposed near a side stay 113 to detect the position of the side stay 113.

A large container 115 is disposed under a seat 114, a controller 153 for monitoring batteries and controlling battery charging operation, a travel controller 154 and a battery cooling fan 155 are disposed under the large container 115, and a ac-dc converter 156 is disposed behind the battery controller 153. A seat switch 157 is disposed under the seat 114 to detect the presence of the driver on the seat 114. A fuse box 116 is disposed above the battery housing 108.

The fuse box 116 is covered with a lid 139, which is removed when replacing a fuse contained in the fuse box 116. The dc-dc converter 156, the fuse box 116 and the battery units 151 are connected electrically to the controllers 153 and 154 by a wiring harness 117 extended along the frame 101.

Spaces around the head pipe 102 and around the front end of the center frame 103 are covered with a front cover assembly 118. The upper wall of the battery housing 108 serves as a step floor. The battery housing 108 is covered with a battery cover assembly 119. The rear portion of the frame is covered with a rear cover assembly 120. The seat 114 is placed on the rear cover assembly 120, and a license plate holder 121 is attached to the rear end of the rear cover assembly 120.

Battery holding bands 123 and air ducts 127 are connected to the hollow center frame 103.

Figure 12:
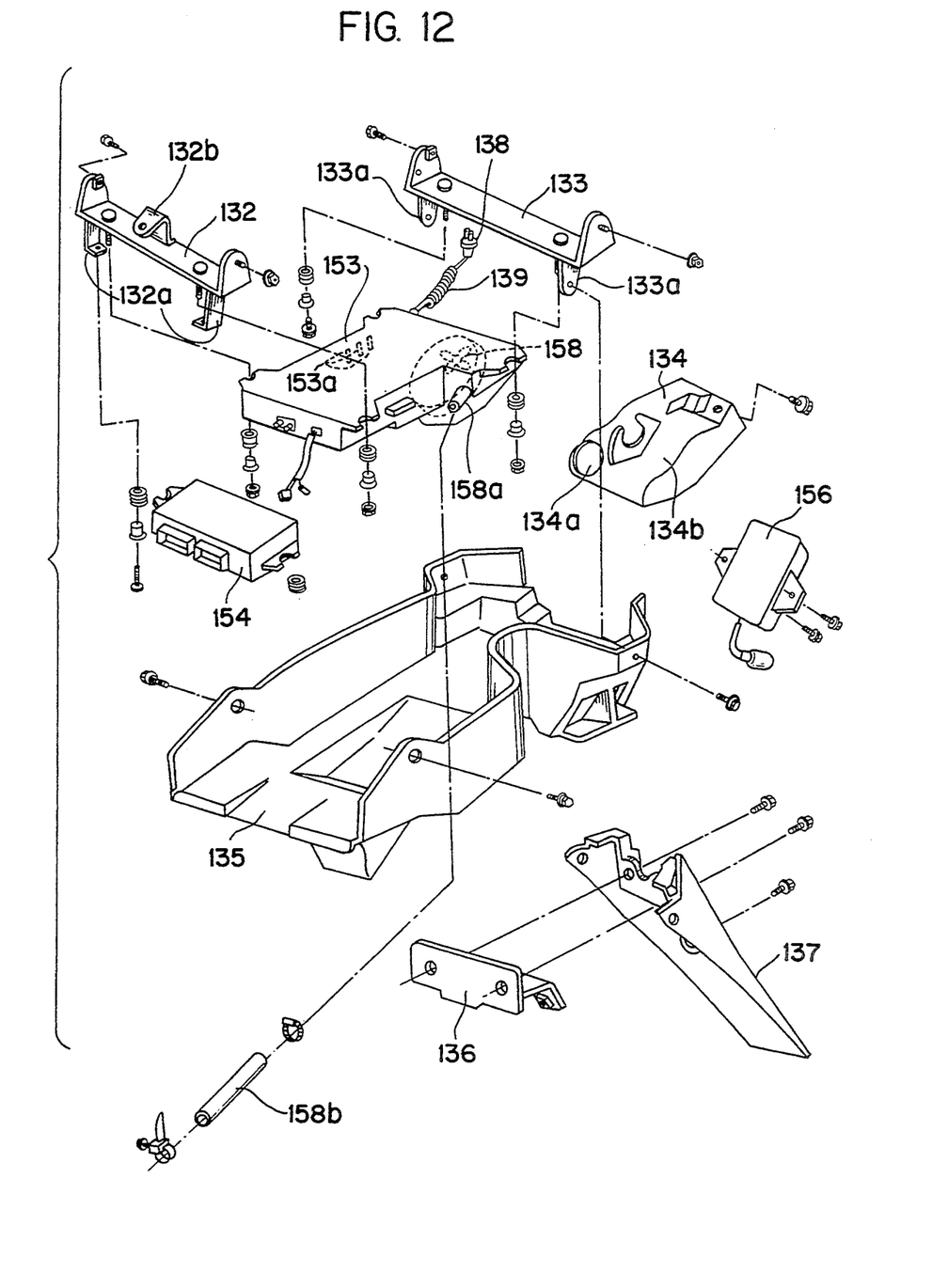
FIG. 12 is an exploded perspective view showing a holding structure for holding a battery controller and a travel controller, and a portion of a rear cover.

FIG. 12 is an exploded perspective view showing a structure for holding the battery controller and travel controller, and a portion of the rear cover assembly in the second embodiment.

A front holding member 132 and a rear holding member 133 extend across and are attached to the O-shaped rear frame 104. The battery controller 153 is spaced from the lower surfaces of the front holder 132 and the rear holder 133 by spacers and fastened at its four corners with screws to the lower surfaces of the front holding member 132 and the rear holding member 133. The travel controller 154 is fastened with screws to a pair of holding lugs 132a projecting from the front holding member 132. A portion of the front holding member 132 is raised to form a lug 132b to which the rear end of a fan case is attached.

The battery controller 153 is provided internally with a charger cooling fan 158, which is operated when charging the battery units. The charger cooling fan 158 sucks air into the case of the battery controller 153 through an opening formed in a connector unit and, if need be, air inlet openings 153a formed in the case, and discharges the air outside or into the rear cover assembly 120 through a discharge pipe 158b connected to the discharge opening of the charger cooling fan 158 and extend along the rear frame 104 for the forced air-cooling of the interior of the battery controller 153.

A charging cord 139 extending outside from the rear end of the battery controller 153 is inserted through a through hole or a recess 134a formed in the side wall of a cord receptacle 134 in the cavity 134b of the cord receptacle 134.

When charging the main power supply, a lid, not shown, is removed, a plug 138 fixed to the free end of the charging cord 139 is taken out from the cord receptacle 134 outside the rear cover assembly 120, pulling out the charging cord 139. Since the charging cord 139 is a curled cord and the cord receptacle 134 is large enough to store the charging cord 139 in its free state, the charging cord 139 can be smoothly returned into the cord receptacle 134 after the completion of the charging operation.

The ac-dc converter 156 is screwed to the rear wall of the cord receptacle 134. The rear end of a rear fender 135 is screwed to a pair of holding lugs 133a projecting from the rear holding member 133 so as to cover the controllers 153 and 154 from under the same. A mudguard stay 136 and a rear mudguard 137 are illustrated in FIG. 12.

The electric vehicle of the present invention may be a light vehicle, such as an electric motorcycle, an electric tricycle or an electric four-wheeled vehicle.

As is apparent from the foregoing description, the electric vehicle in accordance with the present invention is featured by placing the charging unit in a space extending behind the container under the seat and above the rear wheel. Since this space is outside the range of a swinging motion of the rear wheel and comparatively large, the charging unit may be comparatively large.

Since the charging cord is placed above the charging unit and behind the container, a battery can be charged by a battery charging procedure similar to a fuel filling procedure.

When the charger cooling fan is disposed at a position laterally off the center plane of the frame, the charger cooling fan is not exposed directly to debris splashed by the wheels and the leakage of water into the charging unit can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric vehicle comprising:
   a frame;
   battery units mounted on the frame;
   an electric motor powered by the battery units to generate driving force;
   a container for holding a helmet and other items, disposed under a seat for the electric vehicle; and
   a charging unit operatively connected to said battery units for charging said battery units, said charging unit being disposed behind the container and above a rear wheel of the electric vehicle, said charging unit being provided with a charger cooling fan positioned laterally off the center plane of the frame.

2. The electric vehicle according to claim 1, and further including a charging cord extending over the charging unit and behind the container.

3. A battery placement housing for an electric vehicle comprising:
   a frame including a head pipe, a center frame and a rear frame;
   a housing mounted beneath said center frame, said housing including a plurality of compartments, each said compartment being adapted to receive a battery unit;
   an electric motor powered by the battery units to generate driving force;
   a container for holding a helmet and other items, disposed under a seat for the electric vehicle; and
   a charging unit operatively connected to said battery units for charging said battery units, said charging unit being disposed behind the container and above a rear wheel of the electric vehicle, said charging unit being provided with a charger cooling fan positioned laterally off the center plane of the frame.

4. The battery placement housing according to claim 3, and further including a charging cord extending over the charging unit and behind the container.

5. The battery placement housing according to claim 3, wherein said center frame is hollow and includes a plurality of apertures positioned in said center frame for communicating a flow of cooling air to said battery units.

6. The battery placement housing according to claim 5, and further including a fan operatively connected to said battery units for generating a cooling air supplied to said hollow center frame and said plurality of apertures positioned in said center frame for cooling said battery units disposed therein.

7. The battery placement housing according to claim 3, wherein six compartments are disposed beneath said center frame, three on each side of a center line thereof.

8. The battery placement housing according to claim 3, and further including a lid for closing said compartments to prevent debris from entering therein.

9. The battery placement housing according to claim 5, and further including a duct in communication with said housing and said electric motor, a motor cooling fan being operatively positioned for rotation in unison with said electric motor, said motor cooling fan generates a cooling air for cooling said electric motor during operation.

10. The battery placement housing according to claim 3, and further including a pivot shaft operatively connected to said housing, said electric motor being secured to said pivot shaft for pivotal movement therewith.

11. The battery placement housing according to claim 3, and further including a controller, said controller being operatively mounted beneath said charging unit.

12. The battery placement housing according to claim 11, and further including a rear fender, said charging unit and said controller being protected from debris by means of said rear fender.

13. The battery placement housing according to claim 3, and further including a ac-dc converter operatively positioned behind a charge cord receptacle.

* * * * *